United States Patent [19]

Claypool et al.

[11] Patent Number: 4,653,628
[45] Date of Patent: Mar. 31, 1987

[54] APPARATUS FOR ORIENTING CONTAINERS

[75] Inventors: Mark P. Claypool; Gary C. Weber, both of Horseheads, N.Y.

[73] Assignee: Emhart Industries, Inc., Farmington, Conn.

[21] Appl. No.: 841,032

[22] Filed: Mar. 17, 1986

Related U.S. Application Data

[63] Continuation of Ser. No. 592,655, Mar. 23, 1984, abandoned.

[51] Int. Cl.⁴ ............................................. B65G 47/24
[52] U.S. Cl. .................................... 198/395; 198/394; 198/399; 198/415
[58] Field of Search ............... 198/383, 389, 390, 392, 198/394, 395, 398, 399, 400, 401, 415, 345, 463.4, 464.3, 379

[56] References Cited

U.S. PATENT DOCUMENTS

| | | | |
|---|---|---|---|
| 2,638,202 | 5/1953 | Carter | 198/459 |
| 3,216,551 | 11/1965 | Peck | 198/395 |
| 3,415,350 | 12/1968 | Murphy | 198/394 |
| 3,439,792 | 4/1969 | Frank et al. | 198/394 X |
| 3,493,096 | 2/1970 | Antoszewski et al. | 198/395 |
| 3,706,369 | 12/1972 | Ishida et al. | 198/389 |
| 3,722,657 | 3/1973 | Kienle et al. | 198/394 |
| 3,920,118 | 11/1975 | Krooss | 198/395 X |
| 3,958,688 | 5/1976 | Sterling | 198/395 X |
| 3,997,780 | 12/1976 | Waehner | 198/394 X |
| 3,997,781 | 12/1976 | Messman | 198/394 X |
| 4,074,130 | 2/1978 | Messman et al. | 198/394 X |
| 4,149,621 | 4/1979 | Sollenberger et al. | 198/395 |

FOREIGN PATENT DOCUMENTS 1074723 4/1980 Canada ................................ 198/394

Primary Examiner—L. J. Paperner
Assistant Examiner—Lyle Kimms
Attorney, Agent, or Firm—Arthur B. Moore; Arthur J. Samodovitz

[57] ABSTRACT

A container orienting apparatus suitable for flasks and other non-cylindrical containers comprising a pair of continuously moving counter-rotating parallel belts for engaging opposite sides of the finish and/or neck of each container and for rotating each container a predetermined amount by changing the relative speeds of the belts for a predetermined time period. The amount of rotation necessary to rotate each container to a common second orientation is determined by a programmable controller responsive to orientation sensors which determine which one of a number of discrete first orientations each container is in prior to engagement by the belts. The controller contains in memory a plurality of predetermined instruction sets corresponding to the various possible container orientations and the amount of rotation which is required to achieve a predetermined common second orientation. Each instruction set comprises that set of control signals which must be applied to the motors and clutches affecting belt motion to achieve a desired orientation.

9 Claims, 11 Drawing Figures

FIG. 7  MODE SELECTION CHART

| MODE SWITCH POSITION | CONDITION TO BE SENSED | SENSOR STATUS TABLE | | | | INSTRUCTION | SET UP EXAMPLE |
|---|---|---|---|---|---|---|---|
| | | A | B | C | D | | |
| 0 | LETTER DETECT (1 SENSOR) | 0 | X | X | X | NO ROTATE | |
| | | 1 | X | X | X | 180° ROTATE | |
| 10 | FLASK DETECT (2 SENSORS) | 0 | 0 | X | X | INVALID | |
| | | 1 | 0 | X | X | 180° ROTATE | |
| | | 0 | 1 | X | X | NO ROTATE | |
| | | 1 | 1 | X | X | INVALID | |
| 11 | HANDLE DETECT (3 SENSORS) | 0 | 0 | 0 | X | NO ROTATE | |
| | | 1 | 0 | 0 | X | 90° ROTATE | |
| | | 0 | 1 | 0 | X | 180° ROTATE | |
| | | 1 | 1 | 0 | X | INVALID | |
| | | 0 | 0 | 1 | X | 270° ROTATE | |
| | | 1 | 0 | 1 | X | INVALID | |
| | | 0 | 1 | 1 | X | INVALID | |
| | | 1 | 1 | 1 | X | INVALID | |

APPARATUS FOR ORIENTING CONTAINERS

This is a continuation of co-pending application Ser. No. 592,655 filed on Mar. 23, 1984, now abandoned.

BRIEF DESCRIPTION OF THE PRIOR ART

1. Field of the Invention

This invention relates to apparatus for orienting containers from a first position to a second position. More particularly, this invention relates to a container orienting apparatus for sensing a first orientation of generally noncylindrical containers moving on a conveyor and for rotating each container about its axis by a predetermined amount to a common second orientation, the amount of rotation being a function of the output of sensors used for sensing the first orientation.

2. Description of the Prior Art

Bottle, flask or container orienting devices are known in the prior art and are used with conveyors which move the containers during their manufacture or subsequent inspection, labelling, packaging, filling, etc. The terms "bottle", "flask" and "container" orienters may be used interchangeably herein although it should be understood that all such references are intended to refer to apparatus for orienting containers molded from glass, plastic and the like. In many applications the containers are often randomly oriented as they move on horizontal conveyors with their axes vertical. It is necessary to rotate some containers about their respective axes in order to uniformly orient each container relative to the conveyor so that predetermined portions of the containers may properly face a labelling, filling, packing or other apparatus adjacent the conveyor.

Many prior art cylindrical bottle orienters require the use of a projection molded into each bottle. The projections engage corresponding detents on belts and the like, or activate various switches. While such projections are suitable for cylindrical containers they are not for non-cylindrical containers.

Another type of prior art cylindrical container orienting device is disclosed in U.S. Pat. No. 3,722,657 showing the use of parallel, continuously moving belts for engaging cylindrical containers such as cans. The relative belt speeds and directions may be changed in order to transport each container through the transport station in at least two rotational and translational modes. This device overcomes the instability (discussed below with respect to U.S. Pat. No. 3,493,096) although it lacks flexibility since it is mechanically complex and requires use of various gear ratios which must be predetermined for particular operations. Consequently, each configuration of this device is suitable only for a limited number of applications. Futhermore, no means is shown for sensing a variety of pre-existing container orientations before the transfer station and for determining the proper amount of rotation required in order to place all containers in a uniform orientation. Moreover, this device is unsuitable for orienting non-cylindrical containers such as flasks, jugs or rectilinear-body containers.

Some prior art non-cylindrical bottle orienters are known. For example, the principle disclosed in U.S. Pat. No. 3,493,096 is used in a flask orienter which utilizes sensing fingers for detecting the presence and orientation of a flask at an orienting station and means for subsequently moving rotating members into engagement with a cylindrical part of the flask until a reset switch senses proper orientation and de-energizes the circuit. The members are then disengaged allowing the flask to continue along the conveyor. As used herein, the term "flask" means a relatively flat, broad container having one concave surface and one convex surface. One disadvantage of such a device is the instability induced in each flask due to its sudden engagement and disengagement with rotating members. Other disadvantages of this device are its limitation to flask orientation only and its relatively slow speed because of the inertia of its moving components. Other types of non-cylindrical containers cannot be oriented due to the use of the sensing fingers.

There is no known automatic mechanical device capable of orienting non-cylindrical containers other than the aforementioned one disclosed in U.S. Pat. No. 3,493,096 which is only suitable for flasks. Consequently, most non-cylindrical containers are manually oriented thus making the operation labor intensive and very inefficient. There is, therefore, a need for, and it is an object of this invention to provide, an automatic, noncylindrical container orienting apparatus.

It is another object of this invention to provide a container orienting apparatus employing parallel belts movable at predetermined relative speeds where the means of effecting belt speed changes is responsive to a control system which determines the necessary degree of rotation of each container prior to its engagement between the belts.

It is another object of this invention to provide a container orienting apparatus employing counter-rotating parallel belts for use in the orientation of flasks and other generally non-cylindrical and rectilinear-body containers.

It is yet another object of this invention to provide a programmable control means for a non-cylindrical container orienting apparatus to facilitate use of the apparatus for a variety of orienting functions.

SUMMARY OF THE INVENTION

These and other objects of this invention are achieved by the preferred embodiment disclosed herein which comprises in a container orienting apparatus having a conveyor means for linearly moving a succession of containers, spacing means for spacing said containers a predetermined amount, a pair of parallel endless belts downstream of said spacing means, said belts situated at a predetermined height above said conveyor for receiving the cylindrical finish and/or neck portion of each container therebetween, means for rotating the belts in opposite directions in order to cause the belts to translate each container in the direction of conveyor movement, means for changing the relative speeds of the belts and presence sensing means for sensing the presence of each container between the belts, the improvement comprising at least one orientation sensor for sensing the first orientation of each container prior to its engagement with the belts and for producing with respect to each container, a corresponding first signal representative of said first orientation and a programmable control means responsive to each said first signal and to said presence sensing means for producing a predetermined respective control signal, said control signal to be applied to said changing means in order to activate same to rotate the corresponding container a predetermined amount to place it in a predetermined second orientation, and means for applying each said predetermined respective control signal to said changing means.

DESCRIPTION OF THE PREFERRED EMBODIMENT

Figure 1:
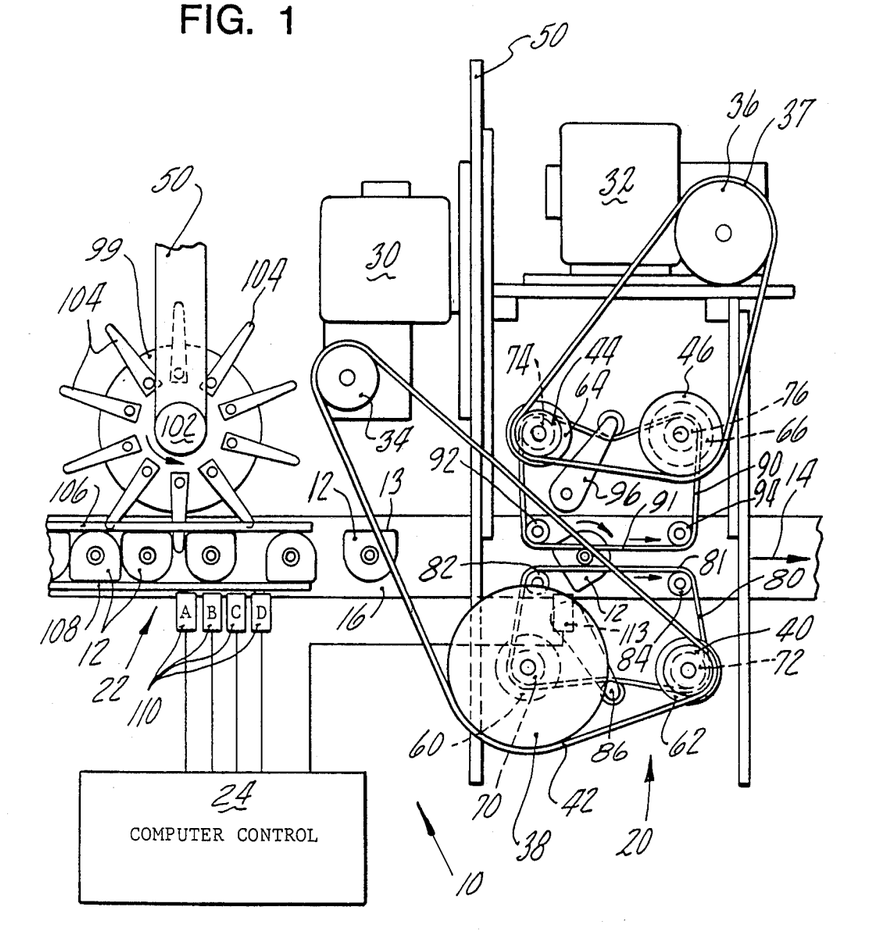
FIG. 1 is a diagrammatic plan view of a preferred embodiment of the invention.

Referring now to FIG. 1 there is shown a diagrammatic plan view of apparatus 10 for orienting non-cylindrical containers 12 moving in direction 14 on continuously moving conveyor belt 16. Apparatus 10 generally comprises an orienting mechanism 20, a spacing and sensing portion 22 and a computer control system 24. The invention is intended for use with containers 12 which have cylindrical finish and/or neck portions but generally non-cylindrical body portions. Containers 12 may be, for example, flasks having opposing concave and convex sides or may have one or more flat sides 13, etc.

Figure 2:
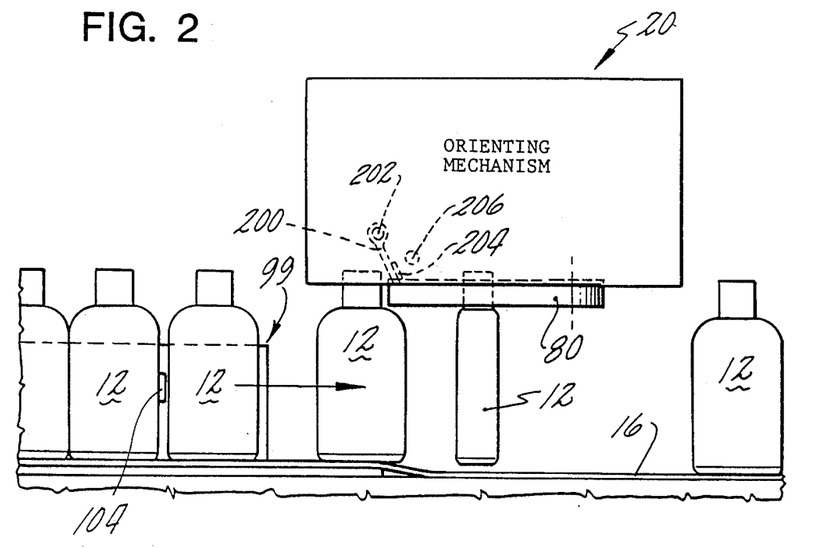
FIG. 2 is a diagrammatic front elevational view of a portion of FIG. 1.

Referring now to FIGS. 1 and 2 it will be noted that orienting mechanism 20 comprises motors 30 and 32 connected via 90° gear boxes to output drive pulleys 34 and 36, respectively. Drive pulley 34 is connected to clutch pulleys 38 and 40 via drive belt 42 and drive pulley 36 is connected to clutch pulleys 44 and 46 via drive belt 37. Motors 30 and 32 are mounted to a frame 50 in a manner such that belts 37 and 42 are coplanar and at a predetermined height above and parallel to conveyor belt 16. Frame 50 includes several conventional members (not shown for clarity) as may be necessary to maintain the proper relationship between various components of this invention. Pulleys 38, 40, 44 and 46 are each mounted on one end of the double ended output shafts of respective clutches 60, 62, 64 and 66. The other (bottom) ends of the vertically oriented output shafts of each clutch are connected to secondary drive pulleys 70, 72, 74 and 76, respectively, all situated in a plane on the side of the clutches (opposite the plane of pulleys 38, 40, 44 and 46 and) closer to conveyor belt 16. A gripping belt 80 is trained about pulleys 70 and 72 and idler pulleys 82 and 84 (mounted to frame 50 by means not shown). Pivotably mounted idler arm 86 serves to maintain tension on belt 80. Similarly, gripping belt 90 is trained about pulleys 74 and 76 and idler pulleys 92 and 94. Pivotably mounted idler arm 96 serves to maintain tension in belt 90. Each belt 80 and 90 has parallel portions 81 and 91, respectively, for engaging containers 12. Each parallel portion 81 and 91 is backed up by a spring-loaded tension support plate (not shown) in order to assist the belts in gripping the containers.

Spacing portion 22 includes an infeed starwheel 99 (driven by means not shown) and a shaft encoder 102 for producing timing pulses as will be explained below. The starwheel drive means and shaft encoder are each operatively connected to computer control 24. Starwheel 99 is operatively situated adjacent conveyor belt 16 upstream of orienting portion 20. The fingers 104 of the starwheel cooperate with parallel guide bars 106 and 108 to form pockets in order to space containers 12 in a predetermined manner to ensure that only one container at a time is ultimately engaged between belts 80 and 90. Guide rails 106 and 108 are arranged so that the containers will pass between them only in one of several discrete orientations, the number of possible orientations depending upon the shape of the container. For example, a flask will pass with either its concave surface facing or not facing the starwheel; a four (equal) sided, rectilinear-body container may pass in one of four orientations, etc.

Apparatus 10 further includes computer control 24 operatively connected to a plurality of container orientation sensors 110 (each individually identified hereafter as A, B, C, D, etc.) and container presence sensor 113. Only four sensors 110 are shown although it will be understood that any number may be used as will be explained below. While the preferred embodiment utilizes optical sensors 110 it is to be understood that any other types of sensors may be used provided they perform a similar indicia detecting function. The placement of each sensor is only diagrammatically shown in FIG. 1; placement criteria are discussed below. While computer control 24 is also operatively connected to all of the aforementioned motors and clutches, these connections are omitted for clarity.

For clarity, sensor 113 is only diagrammatically shown in FIG. 1. While various presence sensors may be used, one advantageous arrangement used in the preferred embodiment is shown in somewhat more detail in FIG. 2 comprising a lever 200 pivotable about axis 202. Lever 200 is situated between the parallel belts and is pivoted by engagement with the finish of each passing container. A simple metallic stud or bolt 204 is secured to the upper side of lever 200 and as the lever is pivoted by a container, bolt 204 is moved so as to be detected by proximity sensor 206 which then provides a signal to computer control system 24. The proximity sensor output passes through conditioning circuitry (not shown) in system 24 so that the changes in the output of sensor 206 caused by lever 200 dipping below the container rim and up the other side do not affect operation.

Figure 3A:
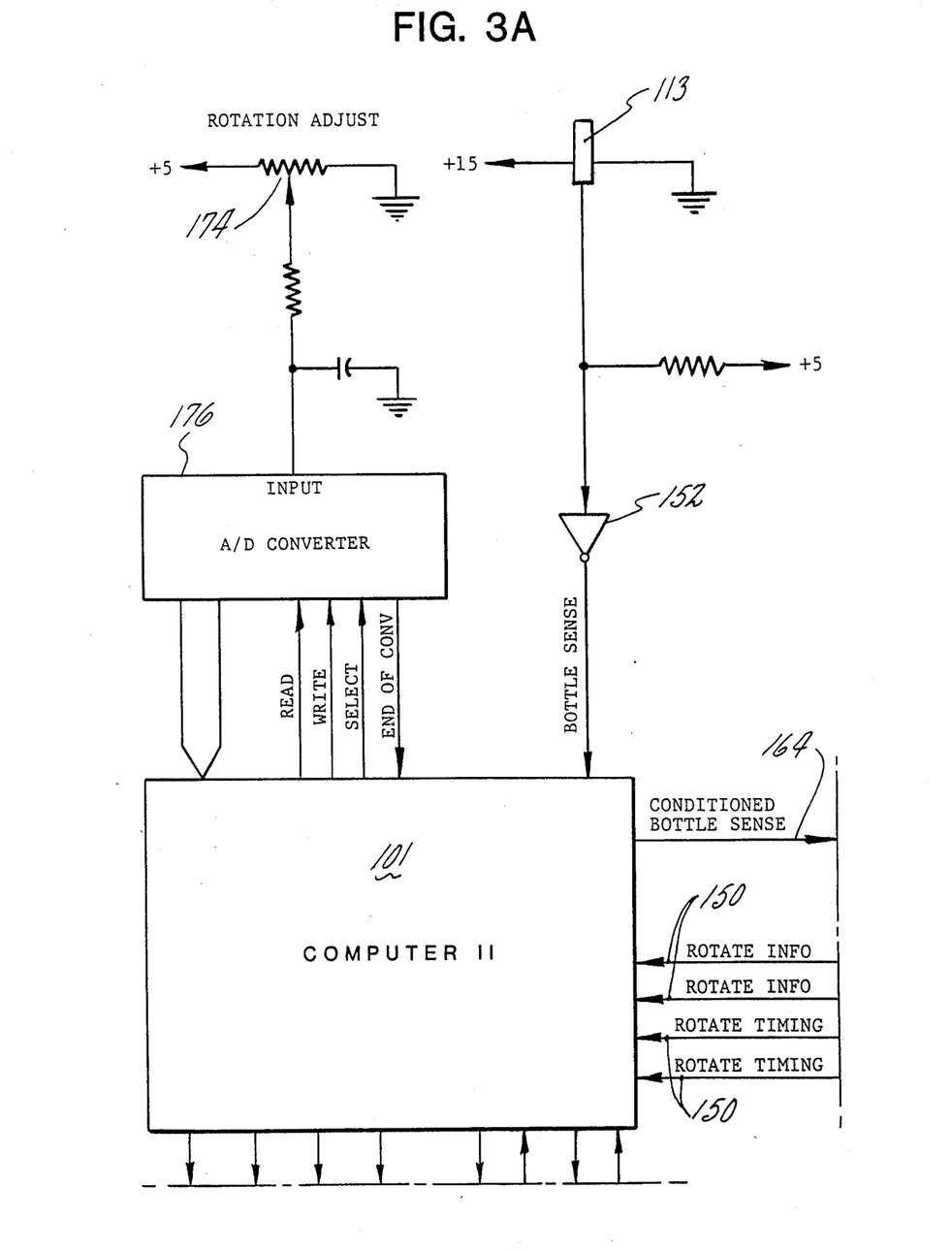
FIGS. 3A, 3B, 3C, 3D and 3E are schematic representations of the control system shown in FIG. 1.
Figure 3B:
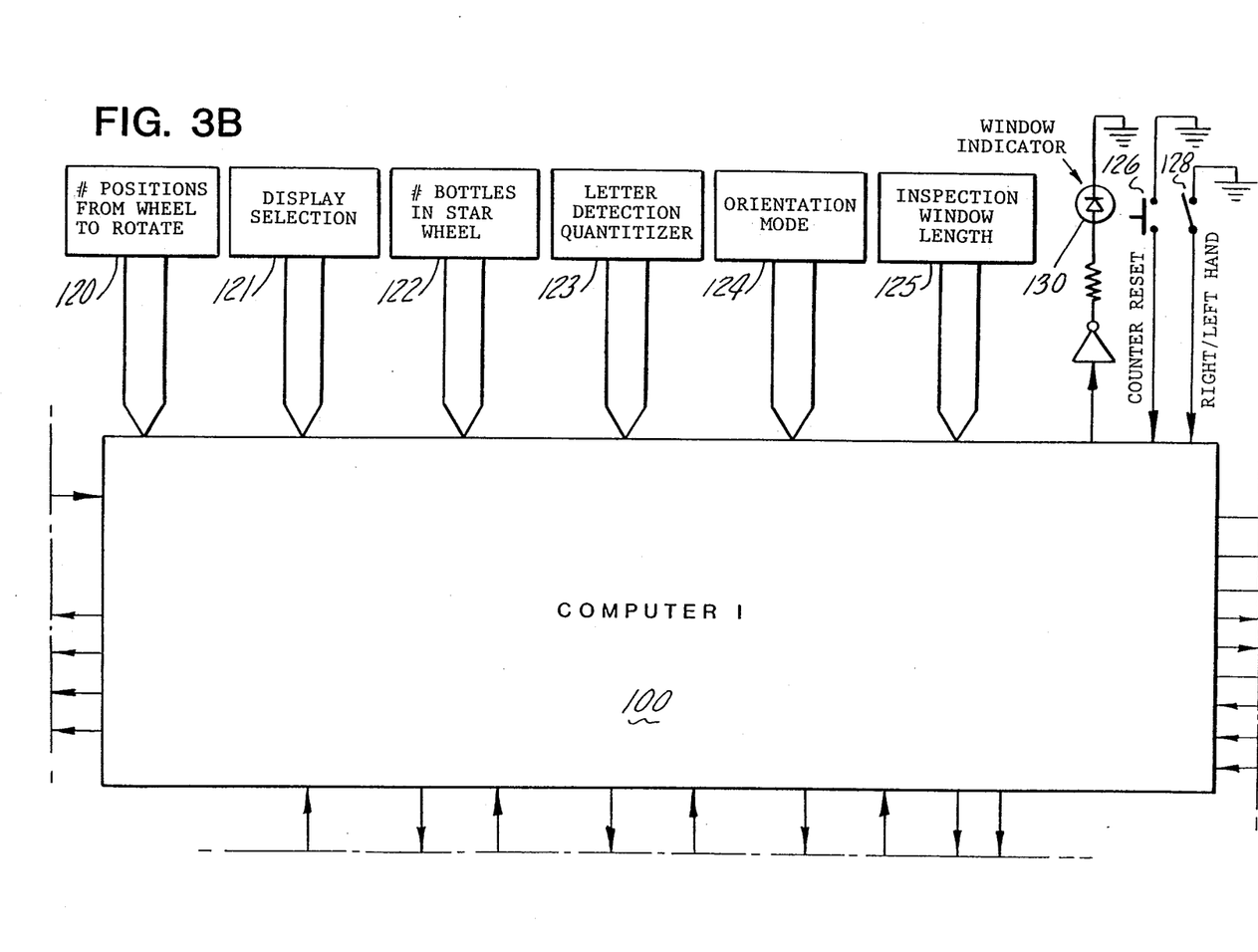
Figure 3C:
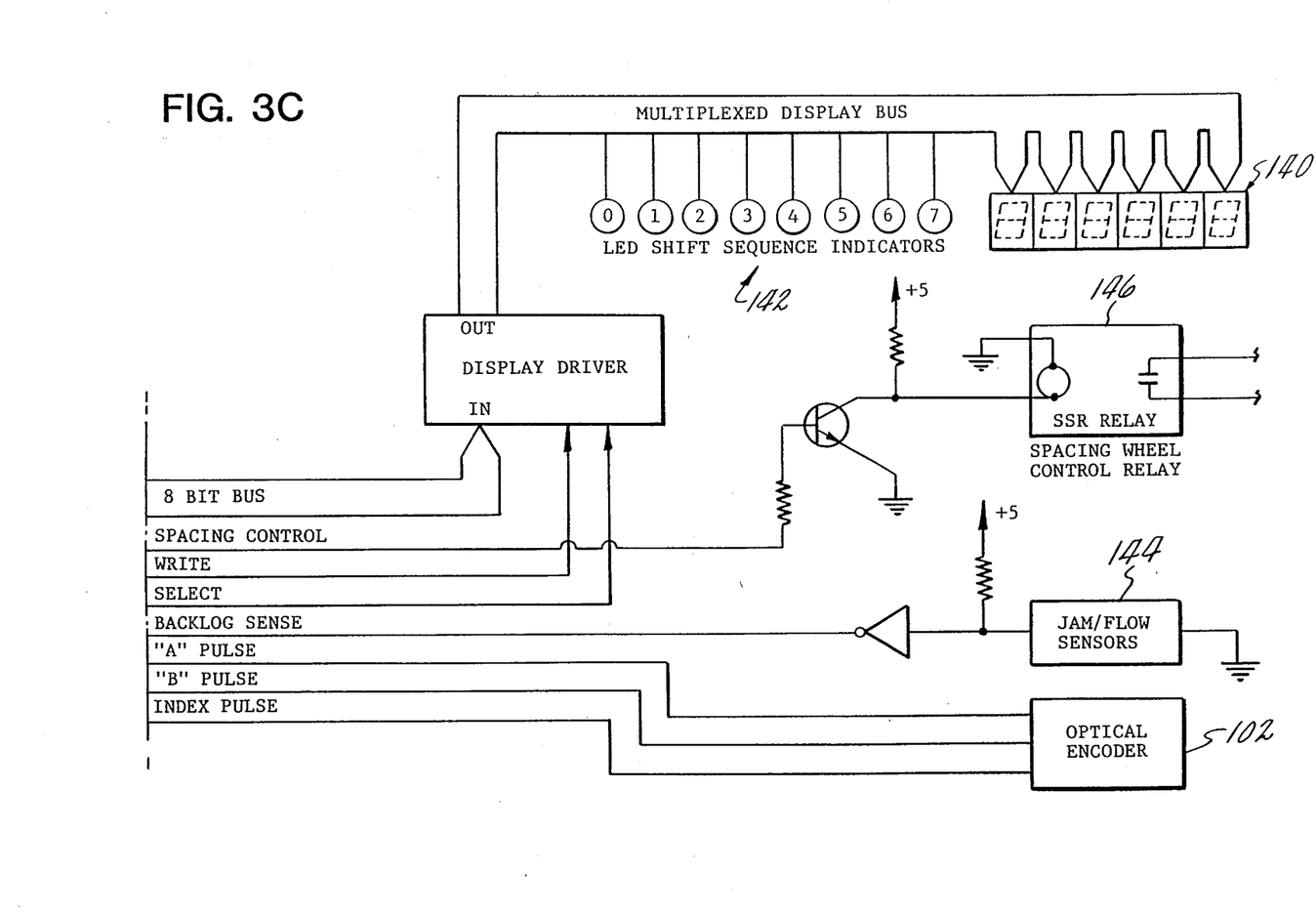
Figure 3D:
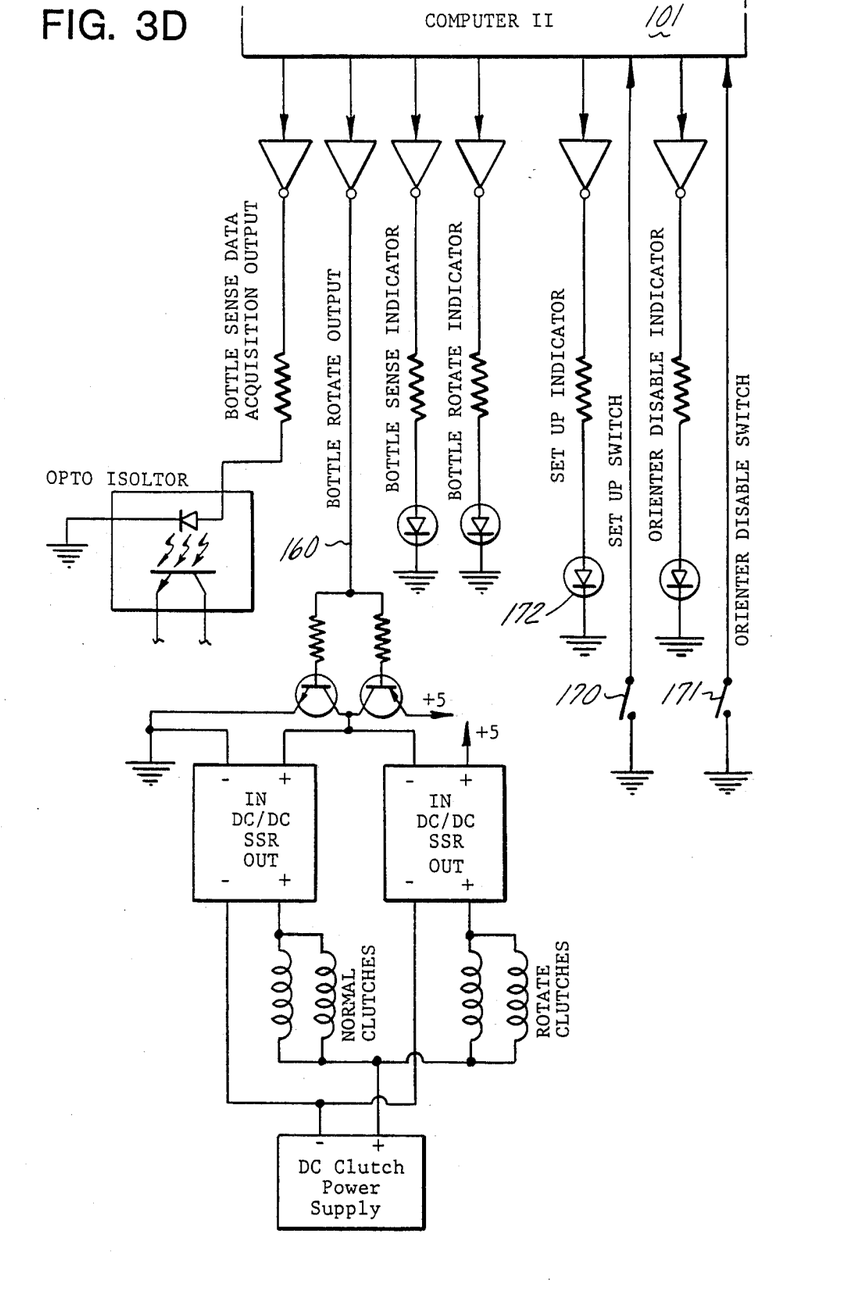
Figure 3E:
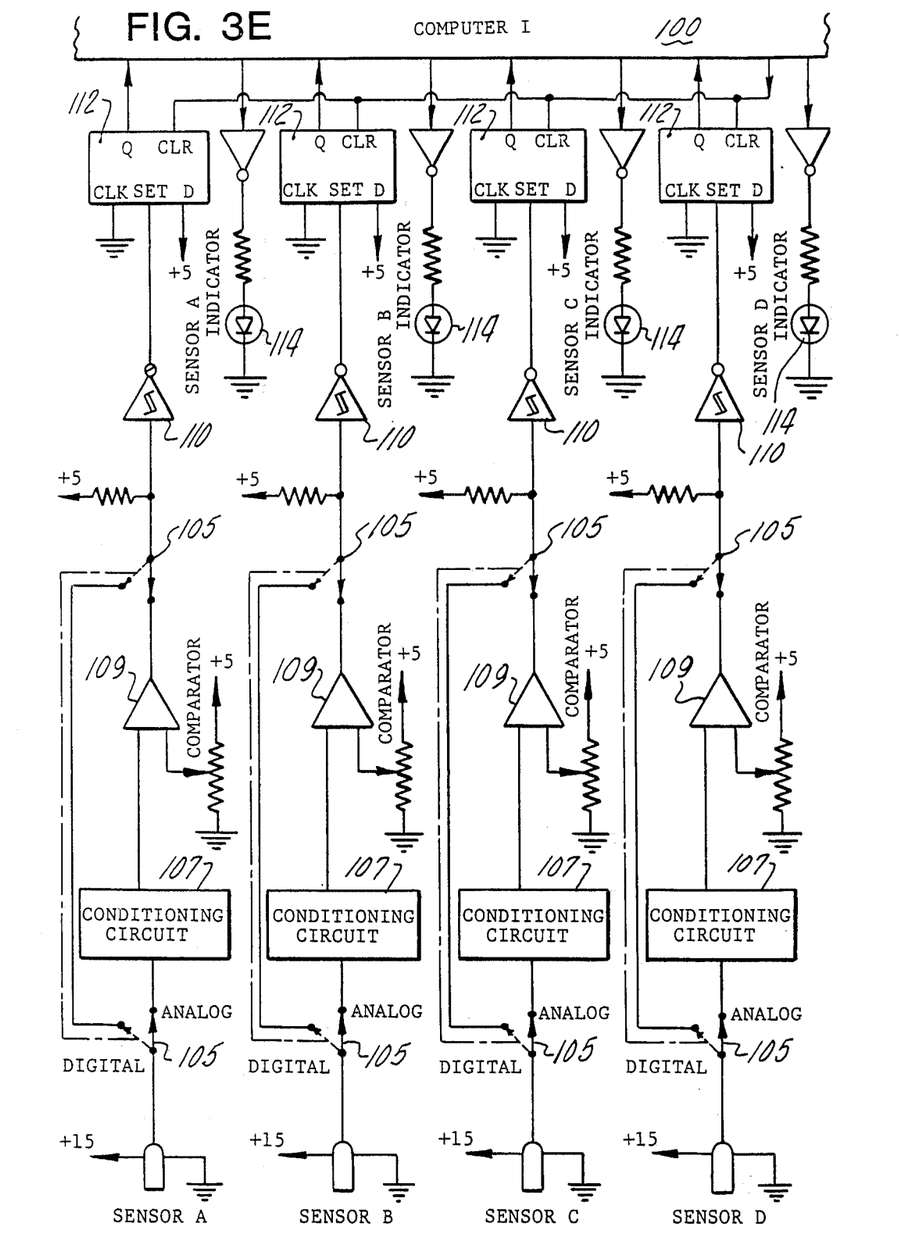
Figure 4:
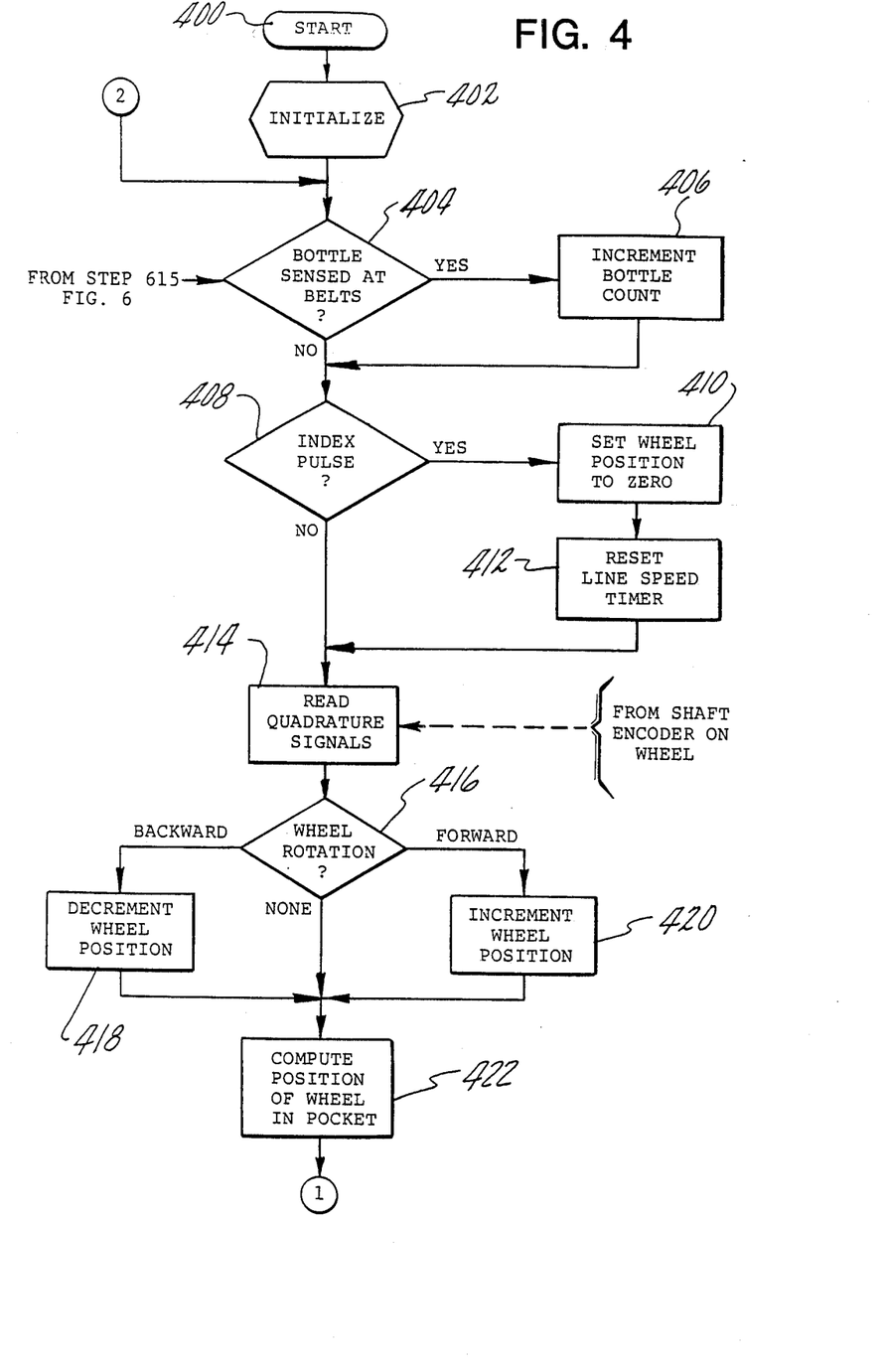
FIGS. 4, 5 and 6 are flow charts describing the operation of the invention.
Figure 5:
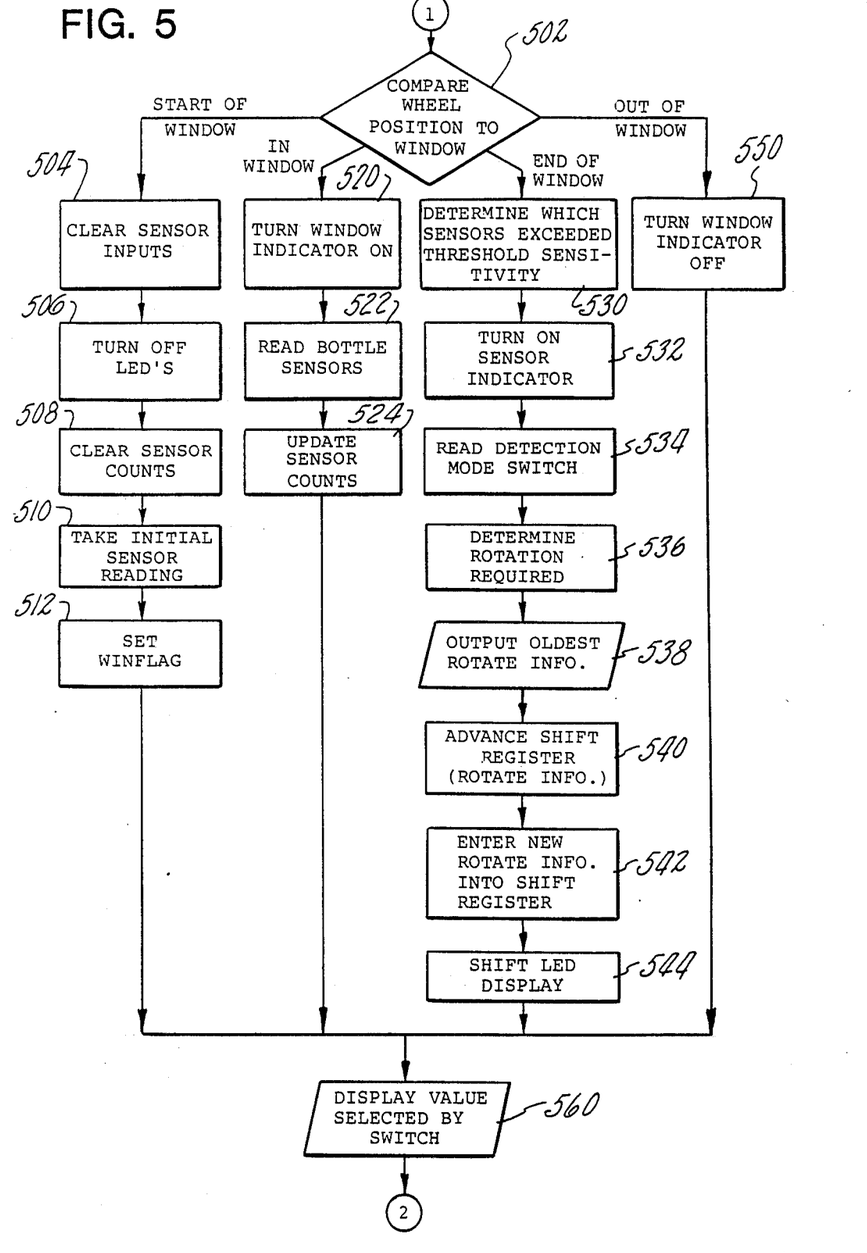
Figure 6:
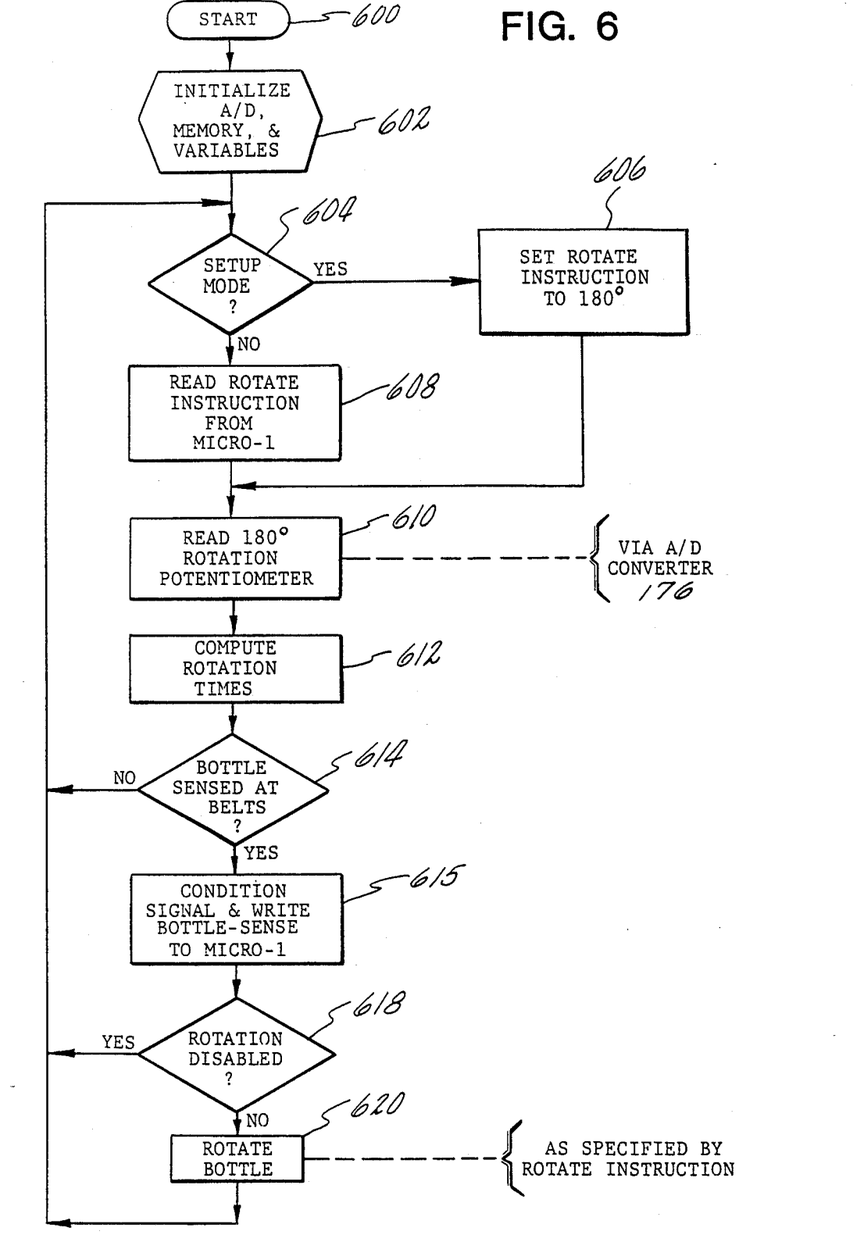

As shown in FIGS. 3A–3E, control system 24 comprises two microcomputers 100 and 101 which, in the preferred embodiment, are conventional 8-bit microcomputer chips programmed in accordance with the program shown in the flowcharts of FIGS. 4–6. Obviously, one computer could be used. Two computers are used in the preferred embodiment to provide parallel processing capability to enhance operational speed of the control system. Computer 100 receives data from optical sensors A, B, C and D, each of which is connected to computer 100 through an identical circuit (therefore, only one will be described herein). The sensor output passes through a digital/analog switch 105 the position of which depends upon the type of sensor utilized. In the case of analog sensors, the switch 105 would be set in the analog position and the sensor output would pass through a signal conditioning and amplifier circuit 107 and comparator 109 to an amplifier 110 and then to the set terminal of D-type flip flop 112. In the case of a digital sensor, the sensor output would bypass circuit 107 and comparator 109. In each case, upon the detection of a selected indicia by a particular sensor, the Q output of flip flop 112 associated with that sensor provides a logical one or zero output to computer 100. Each sensor has a corresponding indicating LED 114 operatively connected to computer 100 in order to provide the operator with a visual display of system operation. As explained below, computer 100 counts the number of pulses from each flip-flop 112 during an inspection window and latches a rotate instruction signal once that number exceeds a programmed value set by a quantitizing input switch.

Computer 100 is programmable by the operator via sets of thumbwheel switches 120 through 125 (best seen in FIG. 3B). Obviously, a keyboard or other suitable input device could be used. While the operation of these switches will be explained in more detail below, it is helpful to briefly list the switch functions at this time. Switch 120 provides an operator selection of the number of shift register positions between the starwheel 99 and the point at which the parallel belts engage the container. This enables the operator to program the system to accept and track various size ware. Switch 121 permits the operator to select predetermined and preprogrammed display formats. Display 140 may be selected to provide a variety of displays giving such information as line speed in containers per minute, container count through the apparatus, encoder position, count of ware that has been oriented and container count for ware oriented, etc. Switch 122 also facilitates system operation with various size ware by enabling the operator to adjust the number of containers in starwheel 99 at any one time. Switch 123 provides the aforementioned quantitizing or pulse count threshold input enabling adjustment of the system sensitivity to various amounts of lettering or other indicia appearing on the containers. (A separate quantitizing input may be provided for each sensor 110 if desired.) Switch 124 is the orientation mode switch used to condition the computer to accept the various sensor combinations listed in FIG. 7. Switch 125 enables operator selection of inspection window durations by adjusting an associated counter. The operator is also able to reset all displayed warecounts with switch 126 and can have apparatus 10 operate with either a left or right moving sucession of containers via switch 128. As will also be understood below, computer 100 also activates window indicator light 130 indicating that a container is (or should be) within the selected inspection window and that it is therefore ready to accept and quantitize data from sensors 110.

In the preferred embodiment computer 100 has a ware spacing control function. The inputs to this function are derived from jam and flow sensors 144. Signals from sensors 144 trigger computer 101 to activate spacing wheel control relay 146 accordingly. Sensors 144 may be, for example, a manual switch (not shown) and photo detectors (not shown) up and downstream of system 10. The manual switch is for local, operation control of the starwheel. The upstream detector ensures that starwheel 99 is provided with a continual supply of containers to avoid any jamming of the fingers. Thus, if an unusually large gap is detected between adjacent bottles the starwheel is turned off until several containers have accumulated. Similarly, if a jam is detected by the downstream detector the starwheel is turned off to stop container flow.

Computer 100 essentially serves to process the various real-time signals produced by the system and integrate them with the various operator inputs in order to coordinate the outputs of sensors 110 with corresponding rotate instructions stored in its memory. As will be understood below, each particular set of outputs from sensors 110 corresponds to a desired amount of rotation necessary to orient each corresponding container to a common orientation. These rotate instructions are sequentially provided to computer 101 along lines 150 when the particular container corresponding to the rotate instruction is sensed between the parallel belts. This bottle sense condition is input to computer 101 from sensor 113 through amplifier 152. An output from computer 101 along line 164 instructs computer 100 to transfer the associated rotate instructions. Computer 101 provides an output on line 160 to activate clutches 60, 62, 64 and 66 in a predetermined manner for a predetermined time in order to achieve the desired degree of rotation as instructed by the rotate instructions from computer 100.

In operation, computer 101 is calibrated as part of the set-up routine. This calibration is permitted only during set-up when switch 170 is closed, thus lighting LED 172. During this time, rotation adjustment pot 174 provides an input to analog to digital converter 176, the digitized output of which is representative of an amount of time required to rotate a test container 180°. Converter 176 may provide, for example, 256 bits of resolution for ten turns of pot 174. During each operational run of apparatus 10, the output of converter 176 is used as a standard for 180° rotation and any other amount of rotation is proportioned accordingly.

To adjust apparatus 10 for various size ware, starwheel 99 or fingers 104 may be changed, thus necessitating an adjustment of switch 122 by the operator in order to correlate the output of encoder 102 with the number of pockets in the starwheel. In the preferred embodiment, encoder 102 provides a 480 pulse per revolution, quadrature output as well as an index pulse once per revolution. Ideally the number of pockets in the starwheel should always be divisible into 960 pulses per revolution so that an even encoder pulse count is available with respect to each pocket. Encoder 102 may be phased with respect to starwheel 99 so that the index pulse (and consequently each encoder pulse count defining the start of each pocket) occurs at a desired starwheel position. This position is chosen during system set-up in conjunction with the placement of sensors 110 in order to have each pocket-start pulse (defined as the encoder pulse count at the start of each pocket) occur when the container is (or should be) in proper position to enable sensors 110 to detect selected indicia, if any. Control system 24 defines an inspection window as a predetermined number of the encoder pulses beginning at the start of a particular pocket (i.e. at a predetermined encoder pulse count) and ending at some point within the pocket as determined by the window duration switch 125. Each window begins X pulses after the start of the previous window where $X = 960 \div$ number of windows per revolution. There may be more than one window used with respect to each container. During each inspection window the outputs of sensors 110 are enabled and accepted or read by computer 100. Each sensor output is latched by its corresponding flip flop 112 and read into the computer before the flip flops are cleared (at the clock rate) in preparation for the next sensor state transition. In the preferred embodiment, each sensor is an optical detector which produces an output related to its proximity to its target area. This target area may be raised lettering molded into the container, a handle, an edge, etc... Consequently, depending upon the condition being sensed by each sensor, a predetermined number of sensor transitions may be necessary within a given inspection window before a rotate instruction can be determined. The quantitizer or pulse count threshold switch 123 serves to eliminate the effect of certain transitions and also can be used to differentiate, for example, between a container side with a lot of lettering and another side which contains a smaller amount of lettering. The variation of inspection window duration allows for either a long time to inspect for letter detection as on the surface of a container which should contain a certain amount of lettering (and, therefore, a certain number of sensor transitions) or a short momentary inspection for determining if a handle or similar "sharp" characterisic is in a specific position.

In operation, gripping belts 80 and 90 are driven at identical speeds in opposite directions such that along their parallel surfaces where they each contact the finish of the containers they move the containers in direction 14. In this configuration "normal" clutches 62 and 64 are engaged and since their drive pulleys 40 and 44 are identical the gripping belt speeds will be identical. Clutches 60 and 66 are disengaged. When a rotate instruction is provided by computer 101 along line 160, clutches 62 and 64 are disengaged and "rotate" clutches 60 and 66 are engaged. Since the drive pulley 46 has a smaller diameter than drive pulley 38, a differential belt speed will occur with belt 90 speeding up and belt 80 slowing down. If there is no rotate instruction, clutches 62 and 64 will remain engaged while the container passes through the apparatus, thus being translated only without any rotation. If a rotate instruction is received, clutches 60 and 66 will be engaged only for a predetermined time sufficient to cause the bottle to rotate for a predetermined number of degrees while it is simultaneously translated. Before the container leaves belts 80 and 90, clutches 60 and 66 are disengaged and 62 and 64 are engaged again in order to stop rotation thus providing a rotational braking effect and enhancing stability. In each case, while a container is merely translated or rotated and translated by belts 80 and 90 its linear velocity before, during and after its contact with these belts will remain substantially the same. As best seen in FIG. 2, conveyor belt 16 is raised along its length just before the containers reach orienting mechanism 20. This faciliates rotation without the drag associated with turning some containers while they rest on the conveyor belt.

Referring now to FIGS. 4-6 there are shown several flow charts describing the operation of the programs required to operate computers 100 and 101 in accordance with the foregoing description. FIGS. 4 and 5 show flow charts generally describing the operation of computer 100 and FIG. 6 shows the flow chart related to computer 101.

While the preferred embodiment utilizes a software based control system it is to be understood that similar operational functions may be achieved with hardwired controllers.

The program begins at starting block 400 and proceeds through an initializing routine 402. At decision block 404 the program determines (from the information present on line 164, as shown in FIG. 3A) whether or not a bottle is sensed at the belts by sensor 113. If so, the bottle count in a separate register is incremented at block 406 for future reference. From steps 404 and 406 the program proceeds to decision block 408 to determine if the clocking pulse is an index pulse output of encoder 102. If so, the program sets the starwheel position counter to zero at step 410 and resets the line speed timer at step 412 and returns to step 414 to read the quadrature signals from the encoder. These signals are utilized by decision block 416 to determine the direction of starwheel rotation, if any, and to decrement or increment a wheel counter accordingly, in blocks 418 and 420. Block 422 represents a subroutine which serves to compute the position of a particular pocket on the starwheel relative to a reference point. This computation considers the number of bottles in the starwheel (switch 122) and the data in the wheel position counter. The program then proceeds to block 502, FIG. 5, at which point various conditions relating to the inspection window are determined. Block 502 compares the current starwheel position to the inspection window parameters set by switch 125 and depending upon the results of the comparison, certain operations take place. At the start of the window, block 504 clears the various inputs from sensors 110, block 506 turns off the corresponding LED's associated with these sensors, block 508 clears the individual counters associated with each sensor 110, block 510 takes an initial sensor reading and block 512 sets a flag indicating that the start of the window has occurred.

Once the position of the wheel is determined to be in the inspection window, block 520 turns the window indicator on, block 522 reads the various sensors 110, and block 524 updates the various sensor counters.

When the proper encoder count has been reached indicating that the end of the inspection window has occurred, block 530 determines which of the various sensors has exceeded its programmed sensitivity and block 532 turns on the LED associated with that sensor. Then, in block 534, the program reads the mode set by switch 124 and in block 536 makes a determination as to the amount of rotation required in order to achieve the desired final common orientation given the particular mode switch setting and the data of the appropriate sensors. Block 536 thus provides an instruction set for the bottle currently in the window, the instruction set being the combination of command signals which must be applied to various components to effect the desired rotation. Utilization of this instruction set must obviously wait until the particular bottle reaches the belts and, therefore, the oldest rotate information associated with a previous container is output by block 538 by, in block 540, advancing the shift register (at the start of each pocket) containing this rotate information. When the system is started-up, the first container through the starwheel gets a rotate instruction set associated with it as it passes through the inspection window. This container travels ahead of its rotate instruction because it does not reach the rotating belts for some time. Consequently, the rotate instruction corresponding to this first container (and every container thereafter) must be delayed so it reaches the belts when its corresponding container does. Since there may be more than one container on the conveyor belt between the starwheel and the parallel rotating belts, the program provides at step 538 that the oldest rotate instruction be output to rotate the container between the belts. Once this old information has been output to computer 101, the new rotate information corresponding to the current container in the pocket is entered into the shift register in block 542. The LED display 142 is shifted in block 544 to provide the operator with a visual indication of which advancing containers will be rotated once they reach the rotating belts.

The system has an internal timer circuit (not shown) in order to provide substitute shift signals to the shift register to maintain a correlation between the rotate instruction and its associated container in the event starwheel 99 stops turning for any reason. The substitute shift signals are desirable when the starwheel stops turning because it stops producing shift signals so rotate instructions won't advance through the shift register. The substitute shift signals are produced at a time interval equal to the shortest interval between the previous eight shift signals. Thus, even if the starwheel stops the rotate instruction associated with the last container out of the starwheel will be shifted in the shift register and properly applied to the rotating belts.

Once block 502 determines that the wheel position is outside the inspection window, the program turns off the window indicator at block 550.

It will be noted that each parallel path in FIG. 5 terminates at block 560 which enables the display in the particular format chosen by switch 121 and then proceeds to point 2, as shown in FIG. 4.

Referring now to FIG. 6, the flow chart describing the operation of computer 101 will be discussed. It will be noted that this program operates in conjunction with the program described with respect to FIGS. 4 and 5, each of the computers interacting with the other. The program with respect to comuter 101 starts at step 600 and proceeds to an initializing routine in step 602. Decision block 604 determines whether the set-up mode has been selected by switch 170 (best seen in FIG. 3D) and if so, block 606 enables use of the rotation adjust pot 174 in order to calibrate the system. If a set-up mode has not been chosen, the program proceeds to block 608 to read the rotate instruction set from block 538. As discussed above, since this is the oldest rotate information, it corresponds to the information associated with the next bottle to be rotated. The program proceeds at block 610 to read pot 174 and compute via step 612 the duration of clutch activation required in order to achieve the proper amount of rotation. The program proceeds to decision block 614 to await the occurrence of a bottle at the belts. If no bottle is sensed, the program returns to step 604. If a bottle is sensed at the belts, the program proceeds to block 615 to instruct computer 100 to output its oldest rotate instructions set to computer 101. (The output of presence sensor 113 is also conditioned at this point, as aforementioned, to limit the possibility of erraneous signals caused by dipping of lever 200.) The program then proceeds to decision block 618 to determine if the rotation has been disabled by switch 171 (best seen in FIG. 3D). If so, the program returns to block 604 and, if not, the bottle then engaged by the belt is rotated at step 620. The program then returns to block 604 to await the next bottle.

Figure 7:
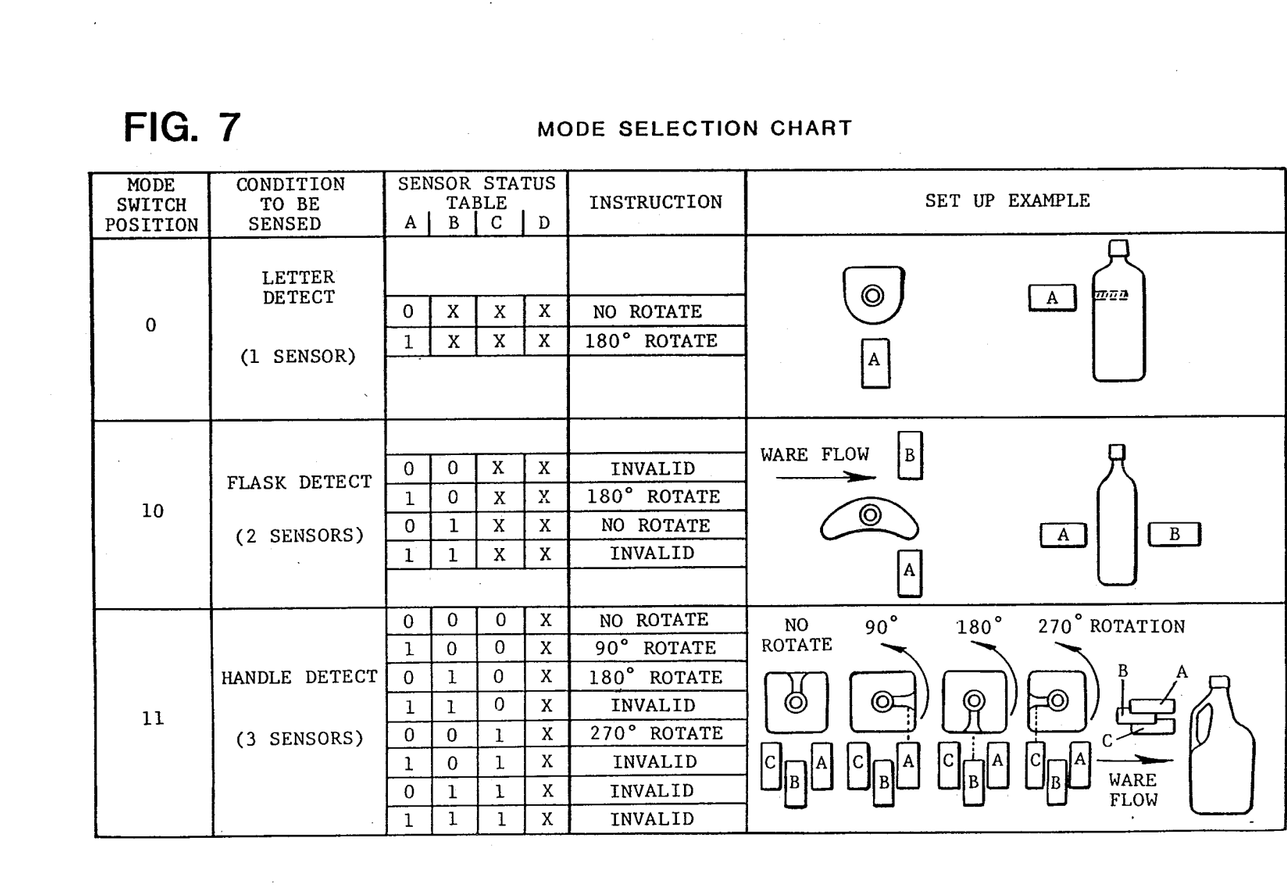
FIG. 7 is a mode selection chart showing examples of sensor status in various modes of operation of the invention.

FIG. 7 shows several alternative configurations of sensors 110 for sensing various conditions associated with different types of containers. FIG. 7 shows the mode switch position, a diagrammatic sketch of the type of container to be oriented in a corresponding mode, a sensor status table and the associated rotation instruction resulting from a particular combination of sensor outputs occurring within each mode.

In each mode of operation described in FIG. 7 the various containers are presented to orientation sensors 110 in one of a discrete number of initial orientations. Therefore, sensors 110 need sense only discrete orientations of the containers because of the construction of the conveyors used for handling of such containers. For example, with the single flat sided bottle shown in FIG. 7 in mode 0 (as also seen in FIG. 1) the containers will be in one of two orientations. This is also true with respect to the flasks shown with respect to mode 10. With respect to the four sided containers shown in mode 11 obviously any one of four container orientations is possible. It will be understood by those skilled in the art that any number of discrete orientations may be possible so long as there is one distinctive portion of the container shape which can be detected. In any event, each of the containers to be oriented by apparatus 10 has at least one substantially cylindrical portion for engaging the parallel belts. Generally, this cylindrical portion is the finish and, as shown in FIG. 7, the finish need not be axially symmetrical.

FIG. 7 shows the use of up to four optical sensors (A, B, C and D) located at predetermined heights above the conveyor belt for viewing predetermined portions of each container. In each mode, the detectors provide signals to control system 24 representative of the indicia or condition they are intended to detect. For example, in mode 0 sensor A is positioned to detect lettering on each container and control system 24 determines whether the detection exceeds a certain pulse count threshold in which event the sensor status will result in an output provided to a predetermined portion of the control system corresponding to a 180° rotation instruction. Mode 10 shows one type of similar sensor arrangement for detecting flask orientations. Mode 11 shows one type of sensor arrangement for detecting the handle of "jug" type containers. It will be understood that any number of alternate sensor arrangements may be suitable so long as the combination of sensor outputs of any one arrangement may be directly correlated to a specific rotate instruction. It should be noted that occasional irregularities in molded containers may cause erroneous sensor outputs. For example, a slight bulge in the surface of a flask may cause a sensor not to precisely detect the passage of the edge of the concave surface of the flask. This and similar types of problems may be greatly diminished by using another sensor positioned above or below the first to detect the same characteristic. It is unlikely the same defect will occur at two places on the flask. A greater number of sensors may obviously be used in critical areas such as container filling lines, etc.

As shown in FIG. 7 with respect to each mode, predetermined combinations of sensor outputs result in predetermined rotate instructions. Control system 24 may obviously be programmed to correlate a particular combination of sensor status to a specific rotate instruction.

It will be understood by those skilled in the art that numerous modifications and improvements may be made to the preferred embodiment of the invention disclosed herein without departing from the spirit and scope thereof.

What is claimed is:

1. In a container orienting apparatus for individually orienting first and second types of containers each container of each type having a circular finish and/or neck portion, each container of said first type also having a body portion with two natural preorientations and each container of said second type also having a body portion with four natural preorientations, said apparatus having conveyor means for moving a succession of one type of said containers at a time, a pair of parallel endless orienting belts situated above said conveyor means for receiving said circular finish and/or neck portions of the containers therebetween, means for circulating said belts in opposite directions and changing means for directing the circulating means to circulate one of said orienting belts at one speed and the other orienting belt at another speed to impart rotational and translational motion to selected ones of said containers to change their orientation, the improvement comprising:

preorienting means located upstream of the orienting belts for urging each of said containers into one of their natural orientations, said preorienting means comprising a pair of parallel guide rails located on opposite sides of said conveyor means, the spacing between said rails being adjustable to correspond to the two natural preorientations of said first type of containers and the four natural preorientations of said second type of containers;

optical orientation sensing means positionable to sense the two preorientations of said first type of the containers while located at an inspection site on said conveyor means and positionable to sense the four preorientations of said second type of the containers while located at said inspection site and for producing sets of output signals representative of the preorientations of the respective type of containers; and     control means connected in operative relation with said optical orientation sensing means and preprogrammed with first and second sets of rotation instructions corresponding to the preorientations of said first and second types of containers, respectively for determining the rotation instruction corresponding to each set of the output signals of the optical orientation sensing means and transmitting said rotation instructions to said changing means to cause said changing means to rotate selected ones of said containers to a predetermined uniform orientation,     said control means including user operated means for designating the set of rotation instructions for the type of containers currently being moved on said conveyor means.

2. An apparatus in accordance with claim 1 further comprising spacing means located upstream of said orienting belts and including a rotating star wheel which engages said containers for spacing said containers at predetermined intervals after being preoriented.

3. An apparatus in accordance with claim 2 wherein
    said star wheel has radially projecting appendages which intersect the path of said containers within said guide rails, and
    said orientation sensing means is supported adjacent to said guide rails and to said star wheel.

4. An apparatus as set forth in claim 1 further comprising:
    spacing means including a rotatable star wheel located upstream of said orienting belts and having appendages which engage said containers for spacing said containers at predetermined intervals after being preoriented, and
    position sensing means coupled to said spacing means for sensing the angular position of said star wheel and generating timing signals indicative of the position of each of said containers being spaced, said control means being connected in operative relation with said position sensing means and including means for determining the time that each of said container arrives at said inspection site based on said timing signals and reading information derived by said optical orientation sensing means when each of said containers arrives at said inspection site.

5. An apparatus as set forth in claim 4, wherein
    said spacing means further comprises a star wheel shaft, and
    said position sensing means cmprises a shaft encoder for sensing the angular position of said shaft of said star wheel.

6. An apparatus as set forth in claim 1 wherein said orientation sensing means comprises at least three optical sensors.

7. Apparatus for orienting containers transported serially on a conveyor, each container having a body of non-circular cross-section and a circular finish and/or neck portion, said apparatus comprising:

preorienting means for preorienting each of said containers into one of a limited number of natural orientations in accordance with the non-circular cross-section of said container body;

orientation sensing means for determining the preorientation of the containers while located on said conveyor at an inspection site and producing outputs representative of the preorientations;

rotating means located downstream of said inspection site and having an entrance to admit said containers for rotating the preoriented containers according to rotation control signals, said rotating means including two parallel belts situated above said conveyor for receiving said cylindrical finish and/or neck portion of all of said containers passing therethrough;

presence sensing means located adjacent to said conveyor and responsive to the arrival of said containers at said entrance of said rotating means for generating activation signals; and     control means programmed with at least one set of rotation instructions corresponding to the preorientations of said containers for producing said rotation control signals based on said outputs of said orientation sensing means and said set of rotation instructions, said control means being responsive to said activation control signals to apply said rotation control signals to said rotating means to cause said rotating means to begin to rotate at least some of the preoriented containers to yield a uniform orientation.

8. A container orienting apparatus as set forth in claim 7 wherein said orientation sensing means comprises at least three optical sensors.

9. In a container orienting apparatus for individually orienting containers each having a body of non-circular cross-section and a circular finish and/or neck portion, said apparatus having conveyor means for moving a succession of said containers, a pair of parallel endless orienting belts situated above said conveyor for receiving said cylindrical finish and/or neck portion of containers therebetween, means for circulating said belts in opposite directions and changing means for directing the circulating means to circulate one of said orienting belts at one speed and the other orienting belt at another speed to impart rotational and translatinal motion to selected ones of said containers to change their orientation, the improvement comprising:

preorienting means located upstream of the orienting belts for urging each of said containers into one of a limited number of natural orientations in accordance with the non-circular cross-section of said containers;

spacing means including a rotatable star wheel having a shaft and appendages, which appendages engage said containers for spacing said containers at predetermined intervals after being preoriented;

optical orientation sensing means positioned for sensing the preorientations of said containers while located at an inspection site and for producing sets of output signals representavie of preorientations of said containers;

timing means including a shaft encoder coupled to said star wheel shaft for sensing the angular position of said star wheel to ascertain the position of each of said containers being spaced and for generating timing signals indicating the arrival of said containers at said inspection site; and control means connected in operative relation with said orientation sensing means for reading said sets of output signals of said optical orientation sensing means in response to said timing signals and producing rotation cntrol signals corresponding to said sets of output signals, said rotation control signals being applied to said changing means to cause said changing means to rotate selected ones of said containers to a predetermined uniform orientation.

* * * * *